(12) United States Patent
Petrou

(10) Patent No.: US 8,217,856 B1
(45) Date of Patent: Jul. 10, 2012

(54) HEAD-MOUNTED DISPLAY THAT DISPLAYS A VISUAL REPRESENTATION OF PHYSICAL INTERACTION WITH AN INPUT INTERFACE LOCATED OUTSIDE OF THE FIELD OF VIEW

(75) Inventor: David Petrou, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/191,873

(22) Filed: Jul. 27, 2011

(51) Int. Cl.
*G09G 5/00* (2006.01)
(52) U.S. Cl. ........................................... 345/8
(58) Field of Classification Search .................... 345/7–9
See application file for complete search history.

(56) References Cited

U.S. PATENT DOCUMENTS

| | | | |
|---|---|---|---|
| 6,232,934 B1 | 5/2001 | Heacock et al. | |
| 6,753,879 B1 | 6/2004 | Deleeuw | |
| 6,771,294 B1 | 8/2004 | Pulli et al. | |
| 6,947,219 B1 * | 9/2005 | Ou | 359/630 |
| 7,215,322 B2 | 5/2007 | Genc et al. | |
| 7,479,967 B2 | 1/2009 | Bachelder et al. | |
| 7,639,208 B1 | 12/2009 | Ha et al. | |
| 7,774,075 B2 * | 8/2010 | Lin | 700/17 |
| 7,812,815 B2 | 10/2010 | Banerjee et al. | |
| 2008/0052643 A1 | 2/2008 | Ike et al. | |
| 2008/0144264 A1 * | 6/2008 | Cosgrove | 361/681 |
| 2008/0198097 A1 | 8/2008 | Ishino et al. | |
| 2009/0110241 A1 | 4/2009 | Takemoto et al. | |
| 2009/0300535 A1 | 12/2009 | Skourup et al. | |
| 2010/0073404 A1 | 3/2010 | Brown et al. | |
| 2010/0079356 A1 | 4/2010 | Hoellwarth | |
| 2010/0103103 A1 * | 4/2010 | Palanker et al. | 345/158 |
| 2010/0149073 A1 * | 6/2010 | Chaum et al. | 345/8 |
| 2010/0182340 A1 | 7/2010 | Bachelder et al. | |
| 2010/0208033 A1 | 8/2010 | Edge et al. | |
| 2010/0257252 A1 | 10/2010 | Dougherty et al. | |
| 2010/0271587 A1 | 10/2010 | Pavlopoulos | |
| 2010/0328344 A1 | 12/2010 | Mattila et al. | |
| 2011/0270522 A1 * | 11/2011 | Fink | 701/208 |

OTHER PUBLICATIONS

Yasuyoshi Yokohji, Ralph L. Hollis, Takeo Kanade, WYSIWYF Display: A Visual/Haptic Interface to Virtual Environment, Presence, Aug. 4, 1999, pp. 412-434, vol. 8, No. 4, Massachusetts Institute of Technology, Kyoto University, Kyoto 606-8501, Japan.

Seilm Balicsoy, Daniel Thalmann, Hybrid Approaches to Interactions between Real and Virtual Humans in Mixed Environments, Eurographics Workshop, Virtual Environments '98, Jun. 16-18, 1998, pp. 1-6, VRLAB-CONF-1998-014, Computer Graphics Laboratory, Swiss Federal Institute of Technology, Stuttgart, Germany.

(Continued)

*Primary Examiner* — Nitin Patel
*Assistant Examiner* — Carolyn R Edwards
(74) *Attorney, Agent, or Firm* — McDonnell Boehnen Hulbert & Berghoff LLP

(57) ABSTRACT

A head-mounted display (HMD) displays a visual representation of a physical interaction with an input interface that is located outside of the field of view. In one embodiment, the visual representation includes symbols that indicate when close proximity or physical contact is made with the input interface. In another embodiment, the visual representation is a simulation of the physical interaction with the input interface. The visual representation displayed by the HMD can beneficially enable the wearer to interact with the input interface more efficiently.

20 Claims, 6 Drawing Sheets

OTHER PUBLICATIONS

Andreas Pusch, Olivier Martin, Sabine Coquillart, Hemp—Hand-Displacement-Based Pseudo-Haptics: A Study of a Force Field Application, 3D User Interfaces, 2008. 3DUI 2008. IEEE Symposium, Mar. 8-9, 2008, pp. 1-2, 978-1-4244-2047-6.

* cited by examiner

HEAD-MOUNTED DISPLAY THAT DISPLAYS A VISUAL REPRESENTATION OF PHYSICAL INTERACTION WITH AN INPUT INTERFACE LOCATED OUTSIDE OF THE FIELD OF VIEW

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of a wearer's field of view. Further, head-mounted displays may be as small as a pair of glasses or as large as a helmet.

SUMMARY

In one aspect, a head-mounted display (HMD) is provided. The HMD includes (1) a see-through display, that is configured to provide a field of view of a real-world environment and to display generated images; (2) an input interface mounted on the HMD in fixed relation to the see-through display such that the input interface is located outside of the field of view; and (3) a controller. The controller is configured to: (a) receive a record of a physical interaction with the input interface; (b) generate, based at least in part on the record, a visual representation of the physical interaction with the input interface; and (c) cause the see-through display to display the visual representation of the physical interaction with the input interface.

In another aspect, a method performed in a head-mounted display (HMD) is provided. The HMD includes a see-through display configured to provide a field of view of a real-world environment and to display generated images. The method involves: (1) receiving a record of a physical interaction with an input interface, in which the input interface is mounted on the HMD in fixed relation to the see-through display such that the input interface is located outside of the field of view; (2) generating, based at least in part on the record, a visual representation of the physical interaction with the input interface; and (3) displaying in real-time on the see-through display the visual representation of the physical interaction with the input interface.

In another aspect, a wearable computing device is provided. The wearable computing device includes: (1) a see-through display that is configured to provide a field of view of a real-world environment and to display generated images; (2) an input interface mounted on the wearable computing device in fixed relation to the see-through display such that the input interface is located outside of the field of view; and (3) program instructions stored in the non-transitory computer-readable medium and executable by the at least one processor to: (a) receive a record of a physical interaction with the input interface; (b) generate, based at least in part on the record, a visual representation of the physical interaction with the input interface; and (c) cause the see-through display to display the visual representation of the physical interaction with the input interface.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
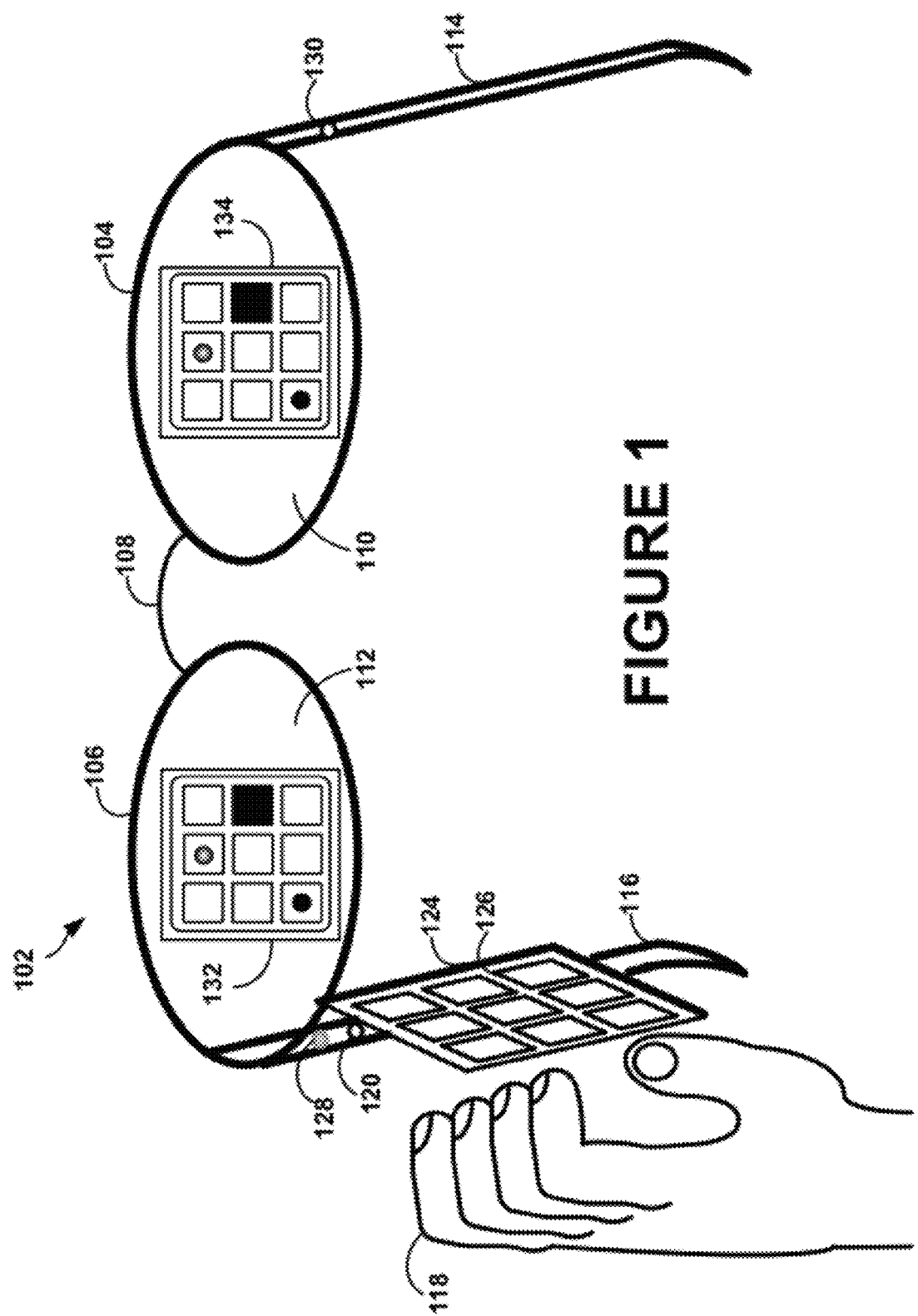
FIG. 1 a head-mounted display (HMD), according to an exemplary implementation.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

A. Overview

The disclosure generally involves a head-mounted display (HMD) that includes a see-through display and an input interface. The HMD could be configured as glasses that can be worn by a person. The input interface could be, for example, a touch pad, keypad, an arrangement of buttons, or any combination thereof. Further, the input interface may be located on one of the arms of the glasses proximate to the wearer's temple, such that the input interface is outside of the wearer's field of view through the see-though display. The position of the input interface may be challenging to a wearer who is accustomed to interacting with an interface, such as a touch pad on a cell phone or a keyboard on a laptop, that is typically used while it is in the wearer's field of view. Accordingly, exemplary methods and systems described herein may provide visual feedback to the wearer through the see-through display. The feedback may provide a visual representation of the wearer's physical interaction with the input interface in real-time. The visual representation may help the wearer to interact with the input interface in a more comfortable and efficient manner.

In one exemplary embodiment, the HMD may provide the wearer with a visual representation of the input interface itself. Further, a simulation of symbols (e.g., colored dots) may appear over the visual representation as the wearer interacts with the interface. For example, the colored dots may appear in response to physical contact or close proximity with the interface. The dots may help the wearer visualize the interaction with the interface. Further, the dots may create an illusionary effect such that the wearer feels like that the interface is right in front of the wearer.

In yet another exemplary embodiment, the visual representation may include a simulation of the wearer's hand interacting with the input interface. In a further aspect, the simulation may portray detailed characteristics of the wearer's hand to provide more realistic feedback to the wearer. When displayed in the HMD, the movement of the simulation may closely resemble the motion of the wearer's actual hand, as the wearer interacts with the interface. In addition, the simulated hand may resemble the wearer's hand in various ways (e.g., skin tone, size, shape, and/or other characteristics). With a realistic simulation of the wearer's hand, the illusionary effect of the interface being in front of the wearer may be further enhanced.

B. Exemplary HMD

In accordance with an example embodiment, a wearable computing system may include various components, including one or more processors, one or more forms of memory, one or more sensor devices, one or more I/O devices, one or more communication devices and interfaces, and a head-mounted display (HMD), all collectively arranged in a manner to make the system wearable by a user. The wearable computing system may also include machine-language logic (e.g., software, firmware, and/or hardware instructions) stored in one or another form of memory and executable by one or another processor of the system in order to implement one or more programs, tasks, applications, or the like. The wearable computing system may be configured in various form factors, including, without limitation, integrated in the HMD as a unified package, or distributed, with one or more elements integrated in the HMD and one or more others separately wearable (e.g., as a garment, in a garment pocket, as jewelry, etc.).

FIG. 1 illustrates an example HMD, according to an exemplary implementation. In this example, the HMD is configured in the form of eyeglasses 102. However, it will be appreciated that other types of HMDs could additionally or alternatively be used. The glasses 102 include frame elements including lens-frames 104 and 106. Also included are center frame support 108, lens elements 110 and 112, and extending side-arms 114 and 116. Lens elements 110 and 112 provide a field of view through which the wearer is able to see the wearer's real-world environment. The center frame support 108 and the extending side-arms 114 and 116 are configured to secure the glasses 102 to a wearer's face via a wearer's nose and ears, respectively. The extending side-arms 114 and 116 may further secure the glasses 102 to the wearer by extending around a rear portion of the wearer's head. Additionally or alternatively, the glasses 102 may be connected to or be integral to a head-mounted helmet structure.

FIG. 1 also illustrates the wearer's hand 118 relative to a finger-operable touch pad interface 124. The touch pad 124 is located on one of the arms 116 of the glasses proximate to a wearer's temple when worn by a wearer. In this position, touch pad 124 is outside of the field of view available through lens elements 110 and 112. In a further aspect, the touch pad 124 may also be another type of interface for inputting information such as a key-based interface. The touch pad 124 may sense a movement of the wearer's hand 118 via capacitive sensing, resistance sensing, or a surface acoustic wave process, among other possibilities. Further, the touch pad 124 may be capable of sensing the movement of a hand 118 in a direction parallel to the pad surface, in a direction normal to the pad surface, or both, and may also be capable of sensing a level of pressure applied. The touch pad 124 may be formed of one or more translucent or transparent insulating layers and one or more translucent or transparent conducting layers. The touch pad 124 may include edges 126 that have a raised, indented, or roughened surface, so as to provide tactile feedback when the hand 118 touches the edge 126 of a touch pad 124. Although not shown, the glasses 102 could include more additional touch pads or keypads. For example, an additional keypad may be attached to the extending side-arm 114, and could be operated independently of the touch pad 124 to provide a duplicate and/or different function.

A camera 120 is shown on the extending side-arm 116 of the glasses 102; however, the camera 120 may be provided on other parts of the glasses 102. The camera 120 may be configured to capture images at various resolutions or at different frame rates. Many cameras with a small form factor, such as those used in cell phones or webcams, for example, may be incorporated into an example of the glasses 102. Although FIG. 1 illustrates one camera 120, more cameras may be used, and each may be configured to capture the same view, or to capture different views. For example, camera 120 may be directed toward the touch pad 124 to capture visual feedback of the wearer's hand 118 interacting with the touch pad 124. Camera 120 may obtain relevant information for displaying feedback to the wearer. The feedback may include a visual representation of the wearer's hand 118 interacting with touch pad interface 124. The representation may then be displayed to the wearer using the lens elements 110 and 112, so as to provide the wearer with visual feedback to more readily interact with the touch pad 124. Alternatively, or in addition to camera 120, a configuration of mirrors may be used to provide visual feedback of the wearer's hand 118 interacting with touch pad 124.

Each of the lens elements 110 and 112 may include a material on which an image or graphic can be displayed. Each of the lens elements 110 and 112 may also be sufficiently transparent to allow a wearer to see through, so as to provide a field of view of the wearer's real-world environment. As illustrated in FIG. 1, these two features of the lens elements could be combined to provide an augmented reality or heads-up display where a visual representation can be superimposed over or provided in conjunction with a real-world view as perceived by the wearer through the lens elements. The visual representation may also take the form of a projected image or any other visual feedback well-known in the art. For example, the eyeglasses 102 may include a first projector 128 coupled to an inside surface of the extending side-arm 116 and configured to project a visual representation 132 onto an inside surface of the lens element 112.

Additionally or alternatively, a second projector 130 may be coupled to an inside surface of the extending side-arm 114 and configured to project a display image onto an inside surface of the lens element 110. The lens elements 110 and 112 may act as a combiner in a light projection system and may include a reflective coating that reflects the light projected onto them from the projectors 128 and 130. In some embodiments, a reflective coating may be omitted (e.g., when the projectors 128 and 130 are scanning laser devices). Since the lens elements 110 and 112 are transparent, a forward viewing field may be seen concurrently with projected or displayed images such as image 132 in the left lens element 112 and image 134 in the right lens element 110. The combination of displayed images and real objects observed in the field of view may provide an augmented reality experience for the wearer.

C. Exemplary Methods

Figure 2:
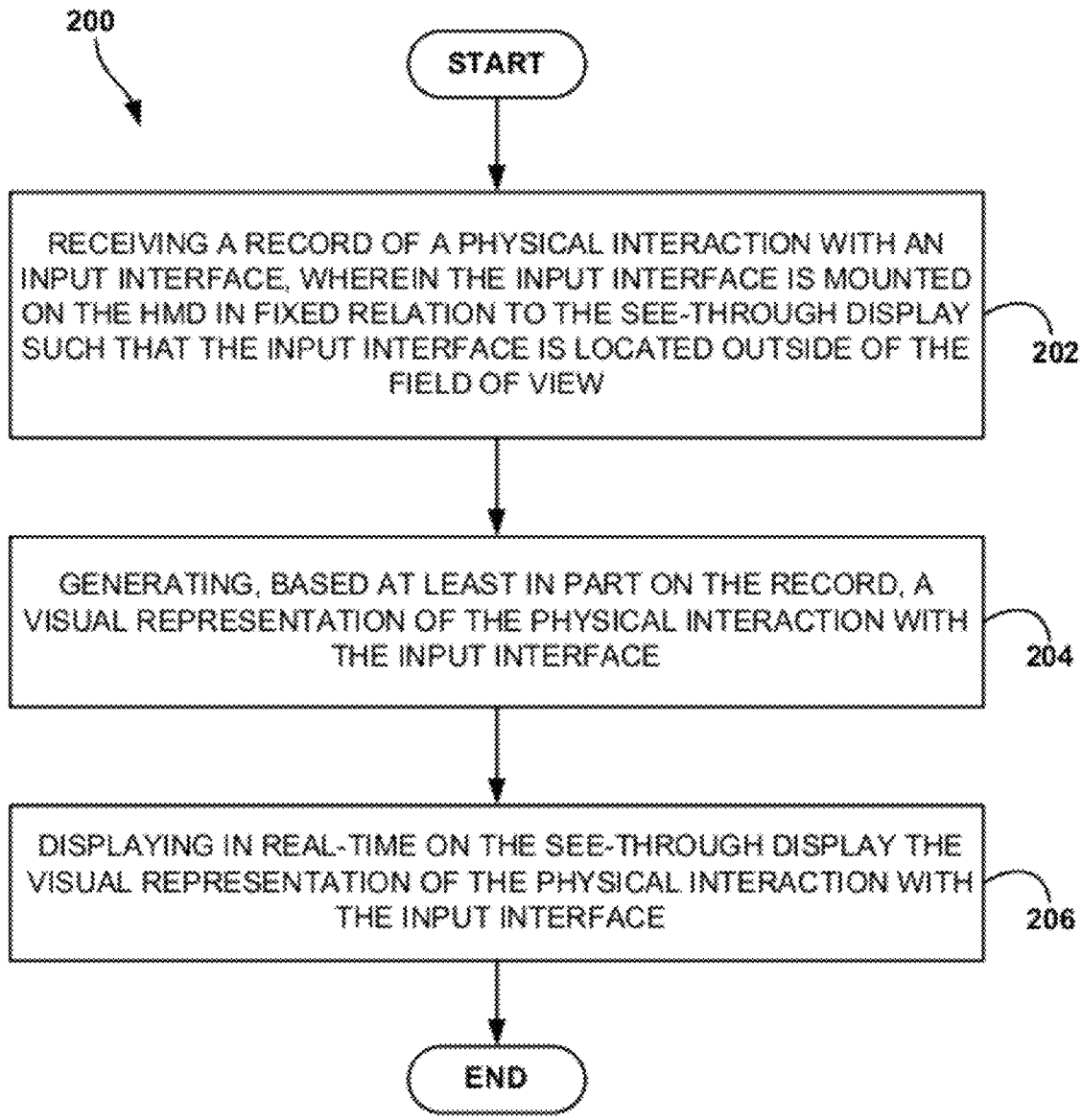
FIG. 2 is a flowchart illustrating a method for displaying a visual representation, according to an exemplary implementation.

FIG. 2 is a flow chart illustrating an exemplary method 200. The method may be carried out by any number of computing devices or systems, however, the device that carries out an exemplary method may be referred to a wearable computer with a head-mounted display (HMD). In some embodiments, the HMD includes a see-through display configured to provide a real-world view. Further, some embodiments may include the HMD displaying the interaction between a wearer of the HMD and an interface attached to the HMD, wherein the interface may be outside the wearer's field of view. Since the wearer is unable to see the interface, the HMD may provide a visual representation with real-time feedback of the wearer's interaction with the interface. The feedback may allow the wearer to more readily orient their hand with the wearer interface.

i. Receiving a Record of a Physical Interaction

As indicated by block 202, exemplary method 200 involves receiving a record of a physical interaction with an input interface, wherein the input interface is mounted on the HMD in fixed relation to the see-through display such that the input interface is located outside the field of view of a wearer.

The input interface may be a touch pad, keypad, an arrangement of buttons, or any combination thereof. Although the input interface may be located in other areas of the HMD, it is generally mounted on the side of the head-mounted display (HMD) proximate to the wearer's temple, such that the input interface is outside of the wearer's field of view.

The physical interaction may be an interaction between the wearer of the HMD and the input interface. For example, the interaction with the interface may involve a manipulator such as the wearer's hand that is closest to the input interface. The wearer's hand may interact with the input interface either directly or with the use of a stylus or other device. Further, other parts of the wearer's body and/or other devices may interact with the input interface.

Receiving a record of the physical interaction may be carried out in multiple ways. Generally, a camera is positioned adjacent to the input interface or in the interface itself, however, the camera may be positioned on other parts of the HMD. In addition, more than one camera may be used, and each may be configured to capture the same view, or a different view of the interaction. In some embodiments, the camera may be configured solely to capture still images or photos of the wearer's hand. These images or photos, or information gathered from them, may be used to create a simulation of the wearer's hand physically interacting with the interface. In one embodiment, the camera maybe a video camera directed to capture real-time videos of the wearer's interaction with the interface.

In addition to the examples above, exemplary embodiments may also be included separately or in aggregation. At least one position and movement of the wearer's hand may be detected through capacitive sensing, resistance sensing, or a surface acoustic wave process, among other possibilities. For example, an interface in the form of a touch pad may capable of sensing finger movement in a direction parallel or planar to the pad surface, in a direction normal to the pad surface, or both, and may also be capable of sensing a level of pressure applied by the wearer's interaction.

ii. Generating a Visual Representation of a Physical Interaction

As indicated by block 204, exemplary method 200 involves generating, based at least in part on the record, a visual representation of the physical interaction with the input interface. Generating the visual representation may be carried out in multiple ways based on the record received in method 202. In some embodiments, the representation may utilize the record to generate a simulation of the input interface. Further, the representation may provide an indication when the wearer is in a close physical proximity to the interface, when the wearer makes contact with the interface, when the interface receives information, or any combination thereof. Further, the representation may provide a simulation of the wearer's movement in real-time to further enhance the wearer's accuracy for interacting with the interface.

For example, consider a scenario in which the camera captures still images of the wearer's hand. These images, or information gathered from them, may be used to create a simulation of the wearer's hand or part of the wearer's hand. The simulation may provide visual feedback to the wearer as the wearer physically interacts with the interface. This representation may be generated in real-time such that the wearer feels as if the interface is located in front of the wearer.

iii. Displaying a Visual Representation of a Physical Interaction

As indicated by block 206, exemplary method 200 involves displaying in real-time on the see-through display the visual representation of the physical interaction with the input interface. Displaying the visual representation may include showing an image or graphic. However, the display may also allow a wearer to see through the image or graphic to provide the visual representation superimposed over or in conjunction with a real-world view as perceived by the wearer. In some embodiments, a wearer of the HMD may not be able to see through the image or graphic but may only be able to view the real-world around the image or graphic. In some embodiments, the HMD may provide an image or graphic in front of one of the wearer's eyes and leave the other areas of the HMD for a real-world view.

D. Exemplary Visual Representations of a Physical Interaction

As illustrated in FIG. 1, the glasses may include lens elements 110 and 112 that are transparent such that a forward field of view may be seen concurrently with projected or displayed images (such as graphic representations 132 and 134). For example, the lens elements 110, 112 themselves may include: a transparent or semi-transparent graphic display, such as an electroluminescent display or a liquid crystal display; one or more waveguides for delivering an image to the wearer's eyes; and/or other optical elements capable of delivering an in focus near-to-eye image to the wearer. A corresponding display driver may be disposed within the frame elements 104 and 106 for driving such a graphic display. Alternatively or additionally, a scanning laser device, such as low-power laser or LED source and accompanying scanning system, can draw a raster display directly onto the retina of one or more of the wearer's eyes. The wearer can then perceive the raster display based on the light reaching the wearer's retina.

i. Exemplary Symbols Displayed in the Visual Representation

Figure 3:
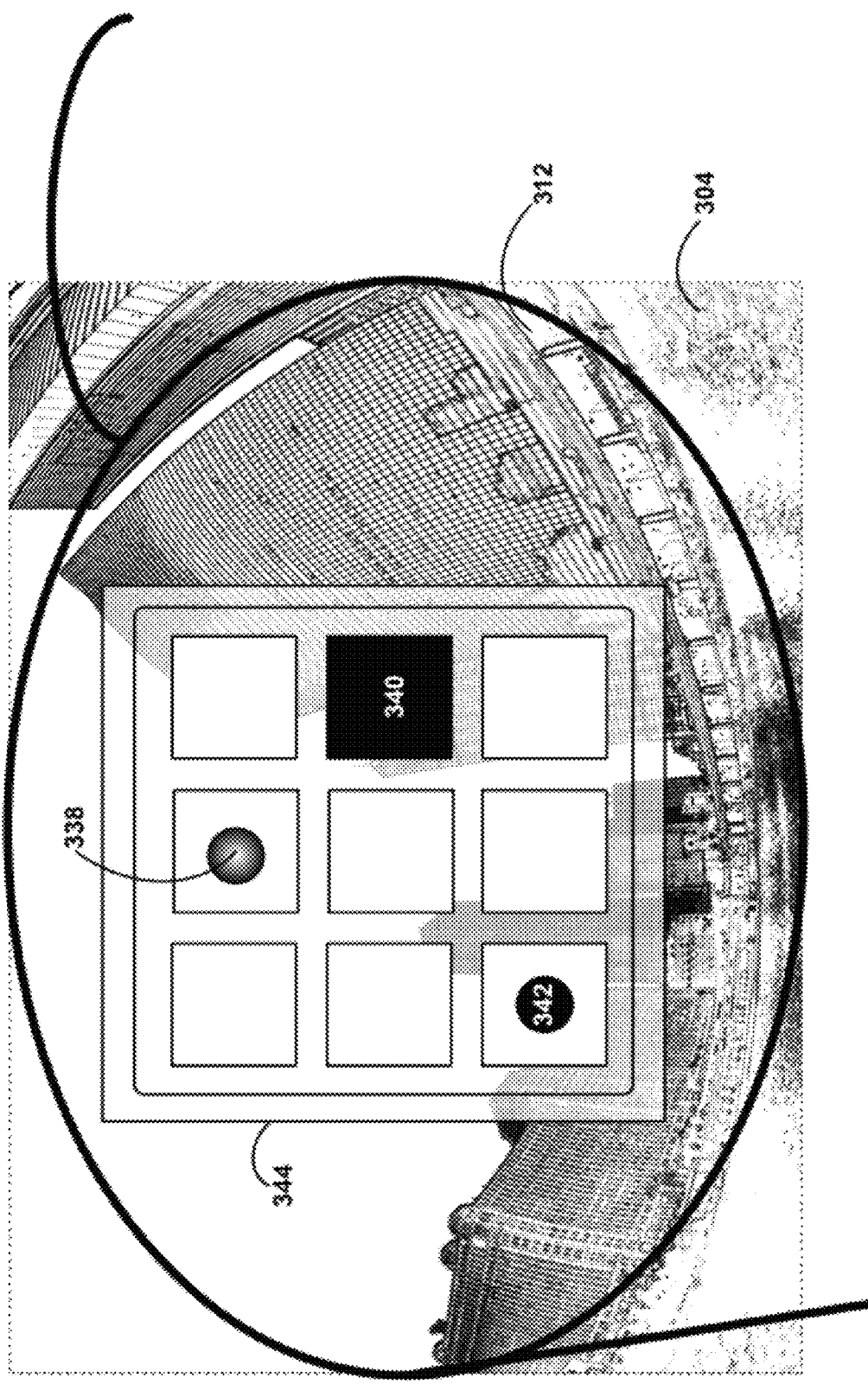
FIG. 3 illustrates a close-up view of a visual representation, according to an exemplary implementation.

FIG. 3 illustrates visual representation 344 and lens element 312, as a close-up view of representation 132 and lens element 112 in FIG. 1. Both representations 344 and 132 simulate a physical interaction with the touch pad 124 shown in FIG. 1. However, FIG. 3 further illustrates the representation 344 and its semi-transparent feature such that the wearer is able to see a portion of real-world environment 304 through lens elements 312.

FIG. 3 illustrates different feedback signals that may be provided to the wearer based on movement of the wearer's hand 118. In this example, symbols 338, 340, and 342 are displayed over a representation 344 of the interface 124, so as to provide visual feedback of the wearer's physical interaction with the interface 124. As shown in FIG. 3, symbols 338 and 342 are in the form of dots. The dots may be displayed in different colors. It should be understood that the symbols may appear in other shapes such as squares, rectangles, diamonds, or other symbols.

The feedback signals may be provided to illustrate that the wearer's hand 118 is in close proximity to the touch pad 124. For example, if the wearer's hand 118 is not in close proximity to the touch pad 124, then representation 344 may remain free of any symbols. When the wearer's hand 118 gets close to the touch pad 124, a dimmed colored dot 338 may appear over a portion of the representation 344. From the appearance of dot 338, the wearer may understand that the wearer's hand 118 is proximately approaching the touch pad 124. As the wearer's hand 118 gets closer to a pad the touch pad 124, a dimmed colored dot 338 may become responsively brighter as shown by the colored dot 342. When the touch pad 124 recognizes a contact with pad 340, the pad 340 may light up entirely to indicate to the wearer the pad 340 has been pressed. Further, multiple dots, 338 and 342, may appear simultaneously as other pads (such as pad 340) illuminate entirely over certain areas on the representation 344 in response to the movement of the wearer's hand 118.

ii. Exemplary Graphic Simulations Displayed in the Visual Representation

As illustrated in FIG. 1, camera 120 is shown to be positioned on the extending side-arm 114 of the glasses 102. According to an exemplary embodiment, camera 120 may capture images of the wearer's hand. These images, or information gathered from them, may be used to create a representation of the wearer's hand 118 physically interacting with the interface. In one embodiment, camera 120 may be a video camera directed to capture real-time videos of the wearer's interaction with the interface.

Figure 4:
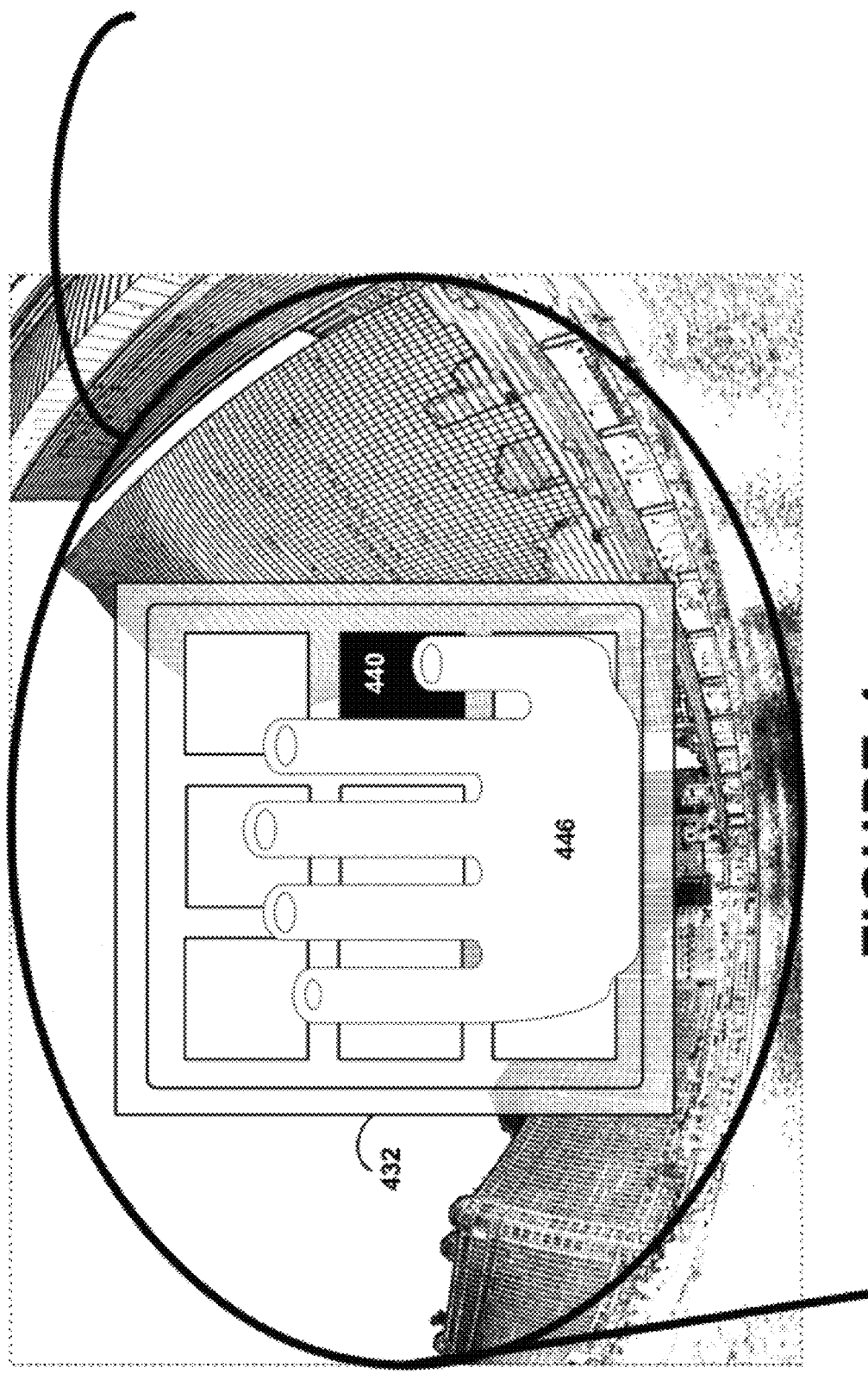
FIG. 4 illustrates a close-up view of a visual representation, according to an exemplary implementation.

FIG. 4 provides a close-up view of the representation 132 previously shown in FIG. 1. However, FIG. 4 does not illustrate symbols (such as 338 and 342 in FIG. 3). Instead, FIG. 4 includes a graphic simulation 446 of the wearer's hand 118. Simulation 446 may also be described as a virtual simulation of the wearer's hand 118. As a more realistic form of visual feedback, simulation 446 may further improve the visual feedback to the wearer. In one embodiment, simulation 446 may be a real-time simulation of the wearer's hand 118 interacting with the touch pad 124. For example, when the wearer extends the index finger of hand 118, representation 432 may simultaneously reflect the movement by extending the index finger in the simulation 446. Further, if touch pad 124 recognizes that a contact was made on a pad 440, representation 432 may display pad 440 lit up entirely to indicate to the wearer that contact was made with touch pad 124.

Simulation 446 may also represent physical characteristics of the wearer's hand 118. As these physical characteristics are improved in simulation 446, the visual feedback becomes more realistic to the wearer. For example, simulation 446 may illustrate a realistic representation of the wearer's hand, closely resembling the skin tone, shape, and size of the wearer's hand 118. In some embodiments, hairs on the wearer's hand, details of the wearer's finger nails, and/or wrinkles on the wearer's hand may also be shown in simulation 446. These resemblances may improve the illusionary effect such that the wearer feels as if touch pad 124 is directly in front of the wearer. Consequently, the wearer may more comfortably orient hand 118 for a desired interaction with the touch pad 124.

Although no illustrated in the figures, in some embodiments, a virtual mirror box may be used to provide visual feedback to the wearer. Using various mirror configurations, the virtual mirror box may reflect visual feedback, which includes the wearer's (actual) hand 118 interacting with touch pad 124. This feedback may "trick" the wearer's brain into thinking that touch pad 124 is directly in front of the wearer as opposed to being outside of their field of view. Providing the closest resemblance of the wearer's hand, the virtual mirror box may provide a superior degree of visual feedback for the wearer to more readily orient their hand 118 to interact with touch pad 124.

iii. Exemplary Combinations of Symbols and Graphic Simulations

Although not illustrated, exemplary symbols and/or indicators, such as 338, 340, and 342 in FIG. 3, may be displayed in conjunction with the graphic simulation 446 in FIG. 4 for a combined effect. In one embodiment, the representation 344 may include symbols and/or indicators (338, 340, and 342) beneath a semi-transparent version of simulation 446.

E. Functional Block Diagram of a Wearable Computing System

Figure 5:
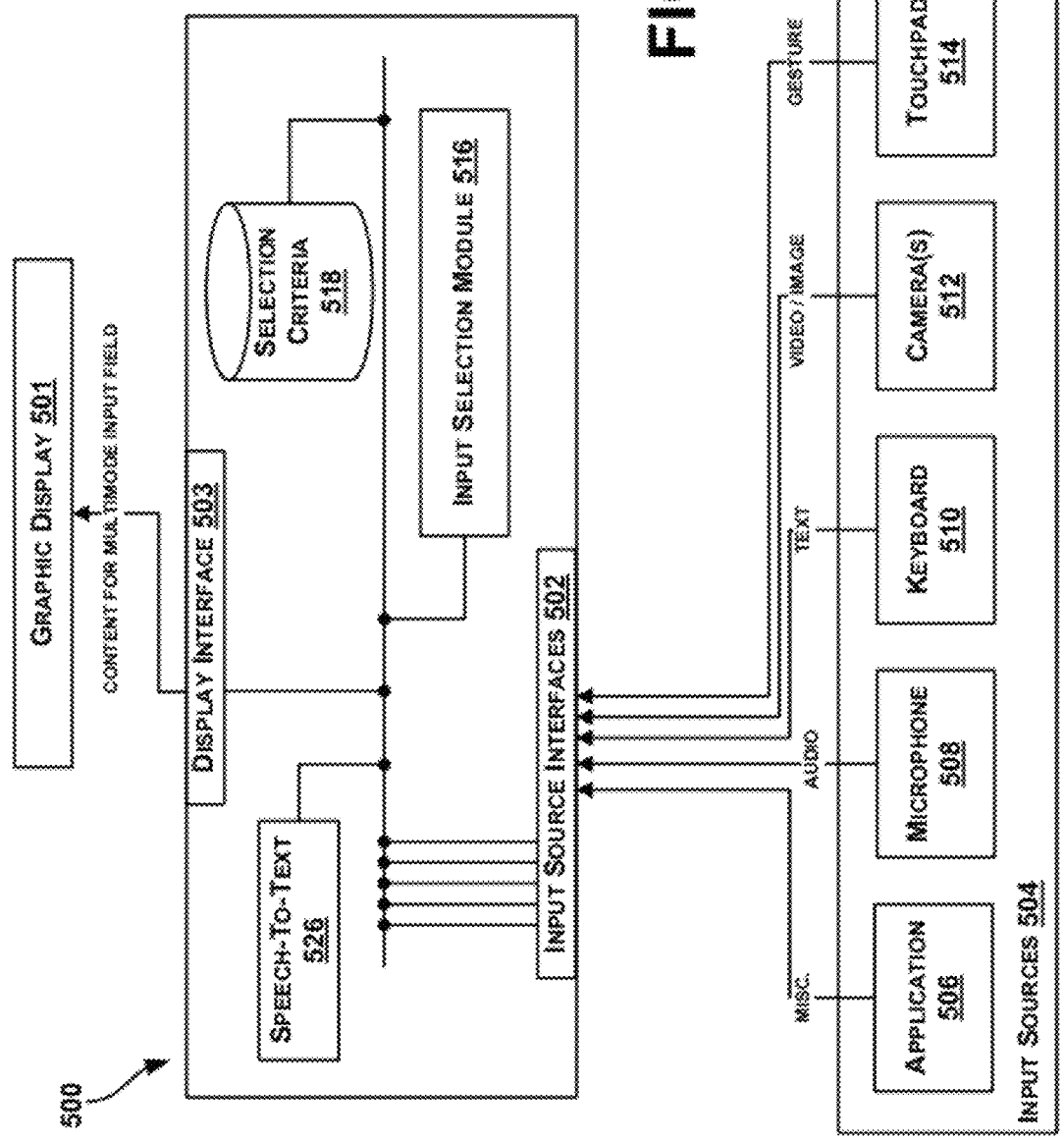
FIG. 5 is a functional block diagram of a wearable computing system according to an exemplary implementation.

FIG. 5 is a functional block diagram illustrating a wearable computing system according to an exemplary embodiment. Exemplary system 500 is configured to intelligently select input content for a multimode input field, which is sent to a display interface 503 for display on a display 501. Generally, the graphic display 501 may be head-mounted display. According to an exemplary embodiment, content for the multimode input field may be based on a variety of modalities of input data, which may be received from any of a number of different input sources.

More specifically, exemplary system 500 is configured to monitor incoming data from a number of input sources 504 for implicit information that may be used for the intelligent selection of input content for the multimode input field. In addition, the incoming data may include explicit input-content instructions, which specify the content for the multimode input field, as well as instructions corresponding to actions on or actions related to the content displayed in the multimode input field. Accordingly, the exemplary system 500 may be configured to detect input-content instructions and other explicit instructions, and to responsively initiate the actions corresponding to such instructions.

i. Sources of Input Data

As shown, exemplary system 500 includes a number of input-source interfaces 502 for receiving data from input sources 504. In the illustrated embodiment, the input sources 504 include, for example, an application 506, a microphone 508, a keyboard 510, a camera 512, and a touch pad 514. A given input-source interface 502 may be configured to interface with and receive data from a single input source 504. Additionally or alternatively, a given input-source interface 502 may be configured to simultaneously interface with multiple input sources 504.

Configured as such, exemplary system 500 can receive a number of different modalities of input data from input sources 504. In the illustrated embodiment, system 500 may receive, for example, audio data from microphone 508, text data from side-mounted keypad 510, video data and/or image data from camera(s) 512, and/or gesture data from a side-mounted touch pad 514. Both keypad 510 and touch pad 514 may be mounted to the side of graphic display 501, out of the field of view of the wearer. A system may be configured to receive other modalities of data, in addition or in the alternative to those described, without departing from the scope of the invention.

ii. Selection Criteria for Input Content

In the illustrated embodiment, system 500 includes an input selection module 516, which generally functions to evaluate the input data from the various input sources 504. In particular, input selection module 516 may be configured to receive input data from the input sources 504 via input source interfaces 502.

The input selection module 516 may further determine what content should be displayed in the multimode input field. Accordingly, to determine what content should be displayed in the multimode input field, input selection module 516 monitors input data for implicit information that is indicative of content the wearer may want to view. To support this functionality, selection criteria database 518 may provide a number of input-selection rules that help determine when implicit information may be used to select an input source. More specifically, an input-selection rule may associate an input source or input sources 504 to be selected when a certain data pattern is detected. Accordingly, when a matching data pattern is detected in the input data received from input sources 504, the input selection module 516 may select the input source indicated by the corresponding input-selection rule.

More specifically, in order to determine what content should be displayed in the multimode input field, input selection module 516 monitors incoming data from input sources 504 for the data patterns indicated by the various input selection rules. The input selection module 500 may then respond to the detection of a matching data pattern by selecting at least one input source 504 for the multimode input field. The selected input source is typically a source that either provides the desired content directly, or provides data that can be used to generate the desired content. The content which is displayed in the multimode input field may accordingly be based on input data from the selected input source.

In a further aspect, input selection module 516 may base the selection of an input source 504 for the multimode input field on other factors, in addition to implicit information in incoming data (e.g., data patterns in data from input sources 504). Further, input selection module 516 is also configured to select content for the multimode input field based on explicit instructions received via input sources 504. In the absence of an explicit instruction to display certain content, the exemplary system 500 may intelligently and automatically determine content for the multimode input field that is believed to be desired by the wearer. As such, the exemplary system is flexible in that the wearer can also indicate the specific content they wish to view in the multimode input field.

In some cases, input selection module 516 may detect multiple concurrent data patterns in the input data. For example, input selection module 516 may detect a first data pattern in data from a first source and, simultaneously, detect a second data pattern in data from a second source. As such, selection criteria 518 may provide input-selection rules that prioritize certain data patterns and/or certain input sources. For instance, selection criteria 518 may prioritize detection of text from side-mounted keyboard 510 over other data patterns detected from speech in audio data from microphone 508. Accordingly, some embodiments may be configured to display a text from keyboard 510 whenever keyboard 510 detects input, regardless of whether there is also a matching data pattern from speech in audio data. Similarly, if input selection module 516 detects that a wearer is gesturing via touch pad 514, a representation of this gesture may be displayed, even when there is a matching data pattern in other incoming data; for example, where touch pad data is given priority over other data by selection criteria 518.

In a further aspect, selection criteria 518 may provide input-selection rules that prioritize certain data patterns when multiple matching data patterns are detected from a common input source. For instance, when commands are received from the touch pad 514, the commands may be given priority over commands from other input sources 504. The selection criteria 518 may specify that this selection rule takes precedence over another selection rule. It should be understood selection criteria 518 may specify other hierarchies and/or other prioritizations of input sources and/or data patterns, without departing from the scope of the invention. Thus, selection criteria 518 may be based on one or more objectives in a specific implementation.

In a further aspect, there may be scenarios where the selection criteria 518 indicates that multiple input sources 504 should be selected. For example, a scenario may exist where text is detected in input data from keyboard 510 and speech is detected in audio data from microphone 508. In this scenario, speech-to-text module 526 may convert the speech from the audio data to text, and this text may be merged with the text from the keyboard for display in the multimode input field. As another example, scenarios may exist where video or an image from camera 512 is displayed in the multimode input field, and text is overlaid on top of the video or image. In such a scenario, the text may be obtained from the keyboard 510 and/or obtained via speech-to-text module 526 converting speech in audio data from microphone 508. Many other combinations of multiple input sources, which may include a variable number of input sources, are also possible.

iii. Selection of Content Based on Implicit Information

As noted, an exemplary system may select an input source for the multimode input field based on implicit information extracted from input data from the various possible input sources. This implicit information may correspond to certain data patterns in the input data.

In a system that includes a microphone or other audio source as an input source, the input-selection module 516 may monitor incoming audio data for various data patterns, according to the input-selection criteria. The input-selection criteria may specify numerous types of data patterns, which may vary in complexity and/or form. Numerous types of data patterns may be identified as providing implicit information, which may be used to select an input source and/or input content for the multimode input field. For example, a person's name may be detected in speech during a wearer's conversation with a friend, and, if available, the contact information for this person may be displayed in the multimode input field.

Similarly, a person could be using a keyboard 510 to edit a document in a word-processing application, which is open in a separate window from the multimode input field. Accordingly, input selection module 516 may monitor the incoming text data for the document. If a person's name is detected in the incoming text data, the input selection module 516 may select the keyboard 510 as the input source for the multimode input field (while continuing to input the received text to the word processing application). The input selection module 516 may then search for the contact information for this person and, if available, display the contact information in the multimode input field.

There are numerous examples of other data patterns that may correspond to implicit information that is indicative of content desired by a wearer. For example, input selection module 516 may detect a data pattern in incoming audio data that is characteristic of car engine noise (and possibly characteristic of a particular type of car, such as the type of car owned or registered to the wearer). The input selection module 516 may interpret this as an indication that the wearer is in a car and responsively launch a navigation system or mapping application in the multimode input field.

As an example, selection criteria 518 may specify that keyboard 510 or touch pad 514 should generally be selected as the input source when a certain data pattern is detected. However, when a temperature context signal indicates that it is below a certain temperature (e.g., 32 degrees Fahrenheit), the wearable computer may infer that the wearer is likely wearing gloves and that use of the keyboard or the touch pad may therefore be difficult. Accordingly, selection criteria 518 may specify that when the same data pattern is detected and the context is determined to be "below 32 degrees" and/or "wearing gloves," for instance, then the wearable computer should select an alternative source. In particular, microphone 508 may be selected in order to allow the wearer to provide information for the multimode input field via speech, which may be easier for the wearer to do when it is cold and/or they are wearing gloves.

iv. Explicit Selection of Input Content

As noted, input selection module 516 may be further configured to receive an explicit input-content instruction, which indicates a specific input source to use for the multimode input field. Explicit input-content instructions may be received via input data from input sources 504 and/or may be provided from other sources. Such input-content instructions are typically indicative of an explicit request by a wearer of the system, and thus may override any implicit information detected in the input data.

Explicit input-content instructions may take various forms, including but not limited to: (a) a speech command received in audio data from microphone 508, (b) a keystroke-based command from keyboard 510, (c) a hand signal captured in a point-of-view video from camera 512, and/or (d) data corresponding to a certain gesture or sequence of gestures on touch pad 514.

In an exemplary embodiment, input selection module 516 may be configured to handle scenarios where implicit information is detected at or near when an explicit input-content instruction is received. Typically, the input selection module will resolve this situation by acting on the input-content instruction and ignoring the implicit information. For instance, in response to receipt of the input-content instruction, the input selection module 516 may cease monitoring of the input sources 504 for the data patterns indicated by the selection criteria 518, and instead display the content indicated by the input-content instruction in the multimode input field.

To act upon speech commands, for example, speech-to-text module 526 may convert speech that is detected in incoming audio data to corresponding text. This text may then be analyzed in order to detect when the text matches a defined speech command. (Alternatively, the audio data itself may be compared to a library of speech commands, in order to determine when a speech command is included in the audio data.) When a match is detected, an action associated with the speech command may be initiated. For example, a wearer may say "select video" in order to output video from camera 512 to the multimode input field. As another example, a wearer may say "launch" and then say an application name in order to launch the named application in the multimode input field. For instance, the wearer may say "launch word processor," "launch e-mail," or "launch web browser." When input selection module 516 detects these speech commands, it may responsively launch a word-processing application, an e-mail application, or a web browser, respectively, in the multimode input field. Many other examples are also possible.

In some scenarios, an indication of content for the multimode input field may be received in speech and/or text that follows a speech command or another explicit instruction. As one specific example, the wearer may say "contact information" and then say "David Smith." The phrase "contact information" may be defined as a speech command that launches a search for the contact information of a subsequently specified contact. Accordingly, input selection module 516 may select a contact list application, a social networking application, and/or other sources of information related to a wearer's contacts or a wearer's friends, as an input source for the multimode input field.

Input selection module 516 may then search the selected input source for the requested contact information. For example, if the wearer's contact list is selected as the input source, the input selection module 516 may use the subsequent speech (e.g., "David Smith") to search the wearer's contact list. Then, if contact information is found for a "David Smith," this contact information may be displayed in the multimode input field. Furthermore, various types of contact information may be displayed. For example, the multimode input field may display phone numbers, an email, an address, a photograph of the contact, or possibly even the contact's profile on a social network, among other types of contact information.

As another specific example, when input selection module 516 detects an "open" speech command followed by a file name, the input selection module 516 may select the particular application that is appropriate to open the file as the input source, launch the selected application in the multimode input field, and then open the named file in the application. As an additional example, the wearer may say "search" and then state or type the terms to be searched, or identify other content to be searched, such as an image, for example. When input selection module 516 detects such a "search" command, it may responsively open a search application in the multimode input field, and input the subsequently stated terms or subsequently identified content to the search application.

As the above examples illustrate, speech commands may directly identify the input source or sources to select (e.g., a "select video" instruction), or may identify an input source by specifying an action that involves the input source (e.g., a "contact information" or "search" instruction). Many other types of speech commands may identify the input source by way of the action associated with the command.

In some embodiments, input-content instructions may be less specific about which input source to select and/or what content to display in the multimode input field. As an example, a "question" command may launch the question-handler application, which may vary the selected input source and/or the displayed content, depending upon the particular question. Other examples are also possible.

Further, certain input sources may be selected and/or certain content may be displayed in response to implicit information in incoming input data, as well as in response to an explicit instruction. For example, as described above, an exemplary system may detect speech in a foreign language and automatically display a translation of the speech in the multimode input field. An exemplary system may also allow this functionality to be selected with an explicit "translate" command (e.g., a wearer speaking the phrase "translate from French to English").

In addition to speech commands, an exemplary system may allow a wearer to provide explicit instructions via other input sources, such as keyboard 510 and/or touch pad 514. Like explicit speech commands, explicit instructions received via other input sources 504 may include input-content instructions to select a certain input source and/or to display certain content in the multimode input field, as well explicit instructions to perform other actions.

F. Exemplary Wearable Computing Device

Figure 6A:
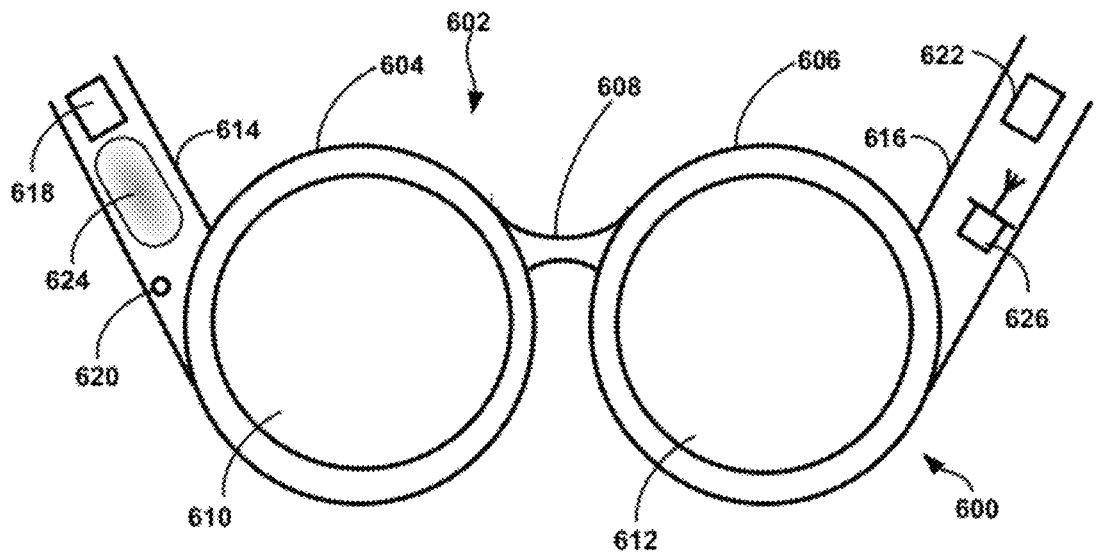
FIGS. 6*a* and 6*b* illustrate a wearable computing device that functions as a head-mounted display, according to an exemplary implementation.
Figure 6B:
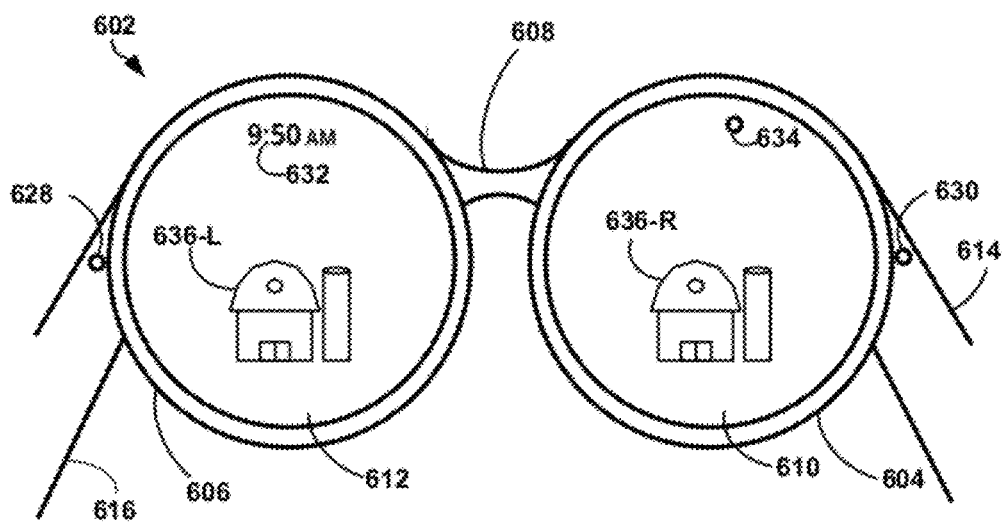

FIGS. 6a and 6b illustrate an example wearable computing device 600 that functions as a head-mounted display (HMD). In this example, the wearable computing device 600 is depicted in the form of eyeglasses 602. However, it will be appreciated that a wearable computing device could be configured in other ways. For example, the HMD may just have one lens or optical element (i.e. a monocular device as opposed to a binocular device).

As illustrated in FIG. 6a, the eyeglasses 602 include frame elements including lens-frames 604 and 606 and a center frame support 608, lens elements 610 and 612, and extending side-arms 614 and 616. The center frame support 608 and the extending side-arms 614 and 616 are configured to secure the eyeglasses 602 to a wearer's face via a wearer's nose and ears, respectively. Each of the frame elements 604, 606, and 608 and the extending side-arms 614 and 616 may be formed of a solid structure of plastic or metal, or may be formed of a hollow structure of similar material so as to allow wiring and component interconnects to be internally routed through the eyeglasses 602. Each of the lens elements 610 and 612 may include a material on which an image or graphic can be displayed. Each of the lens elements 610 and 612 may also be sufficiently transparent to allow a wearer to see through the lens element. These two features of the lens elements could be combined; for example, to provide an augmented reality or heads-up display where the projected image or graphic can be superimposed over or provided in conjunction with a real-world view as perceived by the wearer through the lens elements.

The extending side-arms 614 and 616 are each projections that extend away from the frame elements 604 and 606, respectively, and are positioned behind a wearer's ears to secure the eyeglasses 602 to the wearer. The extending side-arms 614 and 616 may further secure the eyeglasses 602 to the wearer by extending around a rear portion of the wearer's head. Additionally or alternatively, the wearable computing system 600 may be connected to or be integral to a head-mounted helmet structure. Other possibilities exist as well.

The wearable computing system 600 may also include an on-board computing system 618, a video camera 620, a sensor 622, and a communication interface 626. In addition, the wearable computing system 600 may also include a finger-operable touch pad 624 which may also be a larger side-mounted touch pad and/or a side-mounted keypad located on either one of the arms of the glasses proximate to a wearer's temple.

The on-board computing system 618 is shown to be positioned on the extending side-arm 614 of the eyeglasses 602; however, the on-board computing system 618 may be provided on other parts of the eyeglasses 602. The on-board computing system 618 may include a one or more processors and one or more forms of memory, for example. One or more processors may execute instructions stored on some form of non-transitory tangible computer readable storage medium, such as magnetic or optical disk, or the like, and provided for transfer to the wearable head-mounted display's memory during configuration or other procedure(s). The on-board computing system 618 may be configured to receive and analyze data from the video camera 620, the finger-operable touch pad 624, and the wireless communication interface 626 (and possibly from other sensory devices, wearer interfaces, or both) and generate images for output to the lens elements 610 and 612.

The video camera 620 is shown to be positioned on the extending side-arm 614 of the eyeglasses 602; however, the video camera 620 may be provided on other parts of the eyeglasses 602. The video camera 620 may be configured to capture images at various resolutions or at different frame rates. Many video cameras with a small form factor, such as those used in cell phones or webcams, for example, may be incorporated into an example of the wearable system 600. Although FIG. 6a illustrates one video camera 620, more video cameras may be used, and each may be configured to capture the same view, or to capture different views. For example, the video camera 620 may be directed toward the finger-operable touch pad 624 to capture visual feedback of the wearer's hand as the wearer operates the finger-operable touch pad 624. The visual feedback may then be provided to the wearer through the lens elements 610 and 612, so as to provide the wearer with visual feedback to more readily orient the wearer's hand to utilize the finger-operable touch pad 624 and/or side-mounted touch pad and/or side-mounted keypad.

The sensor 622 is shown mounted on the extending side-arm 616 of the eyeglasses 602; however, the sensor 622 may be provided on other parts of the eyeglasses 602. Although depicted as a single component, the sensor 622 in FIG. 6a could include more than one type of sensor device or element. By way of example and without limitation, the sensor 622 could be any one or more of a motion detector (e.g., a gyroscope and/or an accelerometer), a location determination device (e.g., a GPS device), a magnetometer, and an orientation sensor (e.g., a theodolite). Other sensing devices or elements may be included within the sensor 622 and other sensing functions may be performed by the sensor 622.

The finger-operable touch pad 624, shown mounted on the extending side-arm 614 of the eyeglasses 602, may be used by a wearer to input commands. The finger-operable touch pad 624 may sense at least one of a position and a movement of a finger via capacitive sensing, resistance sensing, or a surface acoustic wave process, among other possibilities. The finger-operable touch pad 624 may be capable of sensing finger movement in a direction parallel to the pad surface, in a direction normal to the pad surface, or both, and may also be capable of sensing a level of pressure applied. The finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a wearer when the wearer's finger reaches the edge of the finger-operable touch pad 624. Although not shown, the eyeglasses 602 could include one more additional the finger-operable touch pads, for example attached to the extending side-arm 616, and could be operated independently of the finger-operable touch pad 624 to provide a duplicate and/or different function.

The communication interface 626 could include an antenna and transceiver device for support of wireline and/or wireless communications between the wearable computing system 600 and a remote device or communication network. For instance, the communication interface 626 could support wireless communications with any or all of 3G and/or 4G cellular radio technologies (e.g., CDMA, EVDO, GSM, UMTS, LTE, WiMAX), as well as wireless area network technologies such as a Bluetooth and WiFi (e.g., 802.11a, 802.11b, 802.11g). Other types of wireless access technologies could be supported as well. The communication interface 626 could enable communications between the wearable computing system 600 and one or more end devices, such as another wireless communication device (e.g., a cellular phone or another wearable computing device), a wearer at a computer in a communication network, or a server or server system in a communication network. The communication interface 626 could also support wired access communications with Ethernet or USB connections, for example.

FIG. 6b illustrates another view of the wearable computing system 600 of FIG. 6a. As shown in FIG. 6b, the lens elements 610 and 612 may act as display elements. The eyeglasses 602 may include a first projector 628 coupled to an inside surface of the extending side-arm 616 and configured to project a display image 632 onto an inside surface of the lens element 612. Additionally or alternatively, a second projector 630 may be coupled to an inside surface of the extending side-arm 614 and configured to project a display image 634 onto an inside surface of the lens element 610.

The lens elements 610 and 612 may act as a combiner in a light projection system and may include a reflective coating that reflects the light projected onto them from the projectors 628 and 630. In some embodiments, a reflective coating may be omitted (e.g., when the projectors 628 and 630 are scanning laser devices).

Since the lens elements 610 and 612 are transparent, a forward viewing field may be seen concurrently with projected or displayed images (such as display images 632 and 634). This is represent in FIG. 6b by the field of view (FOV) object 636-L in the left lens element 612 and the same FOV object 636-R in the right lens element 610. The combination of displayed images and real objects observed in the FOV may be one aspect of augmented reality, referenced above.

In alternative embodiments, other types of display elements may also be used. For example, the lens elements 610, 612 themselves may include: a transparent or semi-transparent matrix display, such as an electroluminescent display or a liquid crystal display; one or more waveguides for delivering an image to the wearer's eyes; and/or other optical elements capable of delivering an in focus near-to-eye image to the wearer. A corresponding display driver may be disposed within the frame elements 604 and 606 for driving such a matrix display. Alternatively or additionally, a scanning laser device, such as low-power laser or LED source and accompanying scanning system, can draw a raster display directly onto the retina of one or more of the wearer's eyes. The wearer can then perceive the raster display based on the light reaching the retina.

Although not shown in FIG. 6a, the wearable system 600 can also include one or more components for audio output. For example, wearable computing system 600 can be equipped with speaker(s), earphone(s), and/or earphone jack(s). Other possibilities exist as well.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

I claim:

1. A head-mounted display (HMD), comprising:
 a see-through display, wherein the see-though display is configured to provide a field of view of a real-world environment and to display generated images;
 a touch pad interface mounted on the HMD in relation to the see-through display such that the touch pad interface is located outside of the field of view; and
 a controller, wherein the controller is configured to:
 (a) receive, at least in part from a camera directed toward the touch pad interface, a record of a physical interaction outside of the field of view between a manipulator and the touch pad interface;
 (b) generate, based at least in part on the record, a visual representation of the physical interaction between the manipulator and the touch pad interface; and
 (c) cause the see-through display to show, inside of the field of view, the visual representation of the physical interaction between the manipulator and the touch pad interface.

2. The HMD of claim 1, wherein the controller is configured to cause the see-through display to display the visual representation of the physical interaction between the manipulator and the touch pad interface as the physical interaction occurs.

3. The HMD of claim 1, wherein the HMD further comprises the camera.

4. The HMD of claim 3, wherein the record of the physical interaction comprises a visual record captured by the camera, and wherein at least part of the visual representation comprises at least part of the visual record.

5. The HMD of claim 4, wherein the visual record comprises one of: a still image, a video, or both a still image and a video.

6. The HMD of claim 1, wherein the touch pad interface further comprises a keypad.

7. The HMD of claim 1, wherein the see-through display comprises at least one lens that defines the field of view, and wherein the field of view includes a portion of the real-world environment in front of the at least one lens.

8. The HMD of claim 7, further comprising at least one side portion that extends back from the at least one lens.

9. The HMD of claim 8, wherein the touch pad interface is configured to be mounted on the at least one side portion.

10. The HMD of claim 1, wherein the physical interaction between the manipulator and the touch pad interface comprises the manipulator touching the touch pad interface.

11. The HMD of claim 10, wherein the visual representation of the physical interaction between the manipulator and the touch pad interface comprises a first graphic representing the manipulator and a second graphic representing the touch pad interface.

12. The HMD of claim 11, wherein the manipulator comprises a hand of a wearer of the HMD.

13. The HMD of claim 12, wherein the first graphic comprises a realistic representation with at least one of a wearer's skin tone, a wearer's hand shape, and a wearer's hand size.

14. The HMD of claim 13, wherein the controller is configured to determine at least one of the wearer's skin tone, the wearer's hand shape, and the wearer's hand size based on an image of the wearer's hand.

15. The HMD of claim 11, wherein the visual representation of the physical interaction between the manipulator and the touch pad interface shows the first graphic moving relative to the second graphic to indicate movement of the manipulator relative to the touch pad interface during the physical interaction.

16. The HMD of claim 15, wherein the movement of first graphic relative to the second graphic shown in the visual representation provides an indication of when input data is received by the data interface.

17. The HMD of claim 16, wherein the movement of first graphic relative to the second graphic shown in the visual representation provides an indication of when the manipulator makes physical contact with the touch pad interface.

18. The system of claim 11, wherein the first graphic comprises one or more colored dots overlaying the second graphic at positions that indicate where the manipulator has made physical contact with the touch pad interface.

19. A method performed in a head-mounted display (HMD), wherein the HMD includes a see-through display configured to provide a field of view of a real-world environment and to display generated images, the method comprising:
(a) receiving, at least in part from a camera directed toward the touch pad interface, a record of a physical interaction between the manipulator and a touch pad interface, wherein the touch pad interface is mounted on the HMD in relation to the see-through display such that the physical interaction is located outside of the field of view;
(b) generating, based at least in part on the record, a visual representation of the physical interaction between the manipulator and the touch pad interface; and
(c) displaying in real-time on the see-through display, inside of the field of view, the visual representation of the physical interaction between the manipulator and the touch pad interface.

20. A wearable computing device, comprising:
a see-through display, wherein the see-though display is configured to provide a field of view of a real-world environment and to display generated images;
a touch pad interface mounted on the wearable computing device in relation to the see-through display such that the touch pad interface is located outside of the field of view;
at least one processor;
a non-transitory computer-readable medium; and
program instructions stored in the non-transitory computer-readable medium and executable by the at least one processor to:
(a) receive, at least in part from a camera directed toward the touch pad interface, a record of a physical interaction outside the field of view between a manipulator and the touch pad interface;
(b) generate, based at least in part on the record, a visual representation of the physical interaction between the manipulator and the touch pad interface; and
(c) cause the see-through display to show, inside of the field of view, the visual representation of the physical interaction between the manipulator and the touch pad interface.

* * * * *